(12) United States Patent
Nakamura et al.

(10) Patent No.: US 7,574,989 B2
(45) Date of Patent: Aug. 18, 2009

(54) INTERNAL COMBUSTION ENGINE SYSTEM AND INTERNAL COMBUSTION ENGINE CONTROL METHOD

(75) Inventors: Makoto Nakamura, Okazaki (JP); Mitsuhiro Tabata, Suntou-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 268 days.

(21) Appl. No.: 11/662,580

(22) PCT Filed: Dec. 8, 2005

(86) PCT No.: PCT/JP2005/023002

§ 371 (c)(1),
(2), (4) Date: Mar. 12, 2007

(87) PCT Pub. No.: WO2006/062250

PCT Pub. Date: Jun. 15, 2006

(65) Prior Publication Data

US 2008/0066706 A1 Mar. 20, 2008

(30) Foreign Application Priority Data

Dec. 8, 2004 (JP) .............................. 2004-355567

(51) Int. Cl.
*F02D 41/04* (2006.01)
*F02N 11/08* (2006.01)
*F02N 17/08* (2006.01)
(52) U.S. Cl. ..................... 123/179.4; 701/112; 701/113
(58) Field of Classification Search ............. 123/179.4, 123/491; 701/112, 113
See application file for complete search history.

(56) References Cited

U.S. PATENT DOCUMENTS 7,441,541 B2 * 10/2008 Nakamura et al. .......... 123/333

(Continued)

FOREIGN PATENT DOCUMENTS

DE 195 27 503 A1 1/1997

(Continued)

*Primary Examiner*—Michael Cuff
*Assistant Examiner*—Ka Chun Leung
(74) *Attorney, Agent, or Firm*—Oliff & Berridge, PLC

(57) ABSTRACT

When a crank angle CAa of a specific cylinder, which was expected to stop in a fuel injection stop range over an intake stroke to a compression stroke at a full stop of an engine and received fuel injection, actually exceeds the fuel injection stop range and reaches a preset reference angle CA4, engine stop-state ignition control of the invention ignites the air-fuel mixture in the specific cylinder receiving the fuel injection at a moment of reaching the preset reference angle CA4 (step S260) and simultaneously injects the fuel into a certain cylinder that is in the intake stroke at the moment of the ignition (step S270). When the crank angle CAa of the specific cylinder receiving the fuel injection does not reach the preset reference angle CA4 but exceeds a preset reference angle CA3 that is smaller than the preset reference angle CA4, the engine stop-state ignition control of the invention ignites the air-fuel mixture in the specific cylinder upon a preset wait time elapsed after the full stop of the engine (step S295). This arrangement of the invention effectively restrains direct discharge of the uncombusted fuel at a restart of the engine to prevent the poor emission, while ensuring quiet combustion to reduce the potential vibrations due to the explosive combustion.

6 Claims, 9 Drawing Sheets

U.S. PATENT DOCUMENTS

| | | | |
|---|---|---|---|
| 2004/0159297 A1* | 8/2004 | Kataoka et al. | 123/179.4 |
| 2004/0216719 A1 | 11/2004 | Condemine et al. | |
| 2008/0072860 A1* | 3/2008 | Nakamura et al. | 123/179.4 |
| 2008/0091328 A1* | 4/2008 | Tabata et al. | 701/102 |

FOREIGN PATENT DOCUMENTS

| | | |
|---|---|---|
| EP | 1 036 928 A2 | 9/2000 |
| EP | 1 288 491 A2 | 3/2003 |
| EP | 1 477 654 A1 | 11/2004 |
| JP | A 60-88832 | 5/1985 |
| JP | A 62-255558 | 11/1987 |
| JP | A 4-153558 | 5/1992 |
| JP | A 2001-342876 | 12/2001 |
| JP | A 2004-204747 | 7/2004 |
| JP | A 2004-263569 | 9/2004 |
| WO | WO 03/012273 A2 | 2/2003 |

* cited by examiner

INTERNAL COMBUSTION ENGINE SYSTEM AND INTERNAL COMBUSTION ENGINE CONTROL METHOD

TECHNICAL FIELD

The present invention relates to an internal combustion engine system and an internal combustion engine control method. More specifically the invention pertains to an internal combustion engine system including an internal combustion engine that is capable of individually injecting a fuel in the respective intake systems of multiple cylinders, as well as to a control method of such an internal combustion engine.

BACKGROUND ART

A proposed internal combustion engine system enables ignition and combustion of the air-fuel mixture in a cylinder having a first ignition timing on an automatic restart of an internal combustion engine after its automatic stop (see, for example, Japanese Patent Laid-Open Gazette No. 2001-342876). The ignition and combustion of the air-fuel mixture in the cylinder having the first ignition timing achieves a quick restart of the internal combustion engine.

DISCLOSURE OF THE INVENTION

In an internal combustion engine where a fuel is individually injected into the respective intake systems of multiple cylinders, the fuel injection is generally performed in a final phase of an exhaust stroke. The ignition and combustion of the air-fuel mixture in a selected cylinder having a first ignition timing accordingly requires fuel injection into the selected cylinder in the final phase of the exhaust stroke immediately before a stop of the internal combustion engine. The selected cylinder having the first ignition timing is expected to stop in a certain range over an intake stroke to a compression stroke in a stop of the internal combustion engine. The varying friction of the internal combustion engine due to its state change and aged deterioration may, however, cause deviation of the actual stop position of the internal combustion engine from its predicted stop position. The selected cylinder receiving the fuel injection immediately before the stop of the internal combustion engine for a quick restart of the internal combustion engine may thus actually not stop at the predicted stop position but may enter an expansion stroke. This leads to direct discharge of the uncombusted fuel at a restart of the internal combustion engine and undesirably worsens the emission.

The internal combustion engine system and the corresponding internal combustion engine control method of the invention thus aim to ensure a quick restart of an internal combustion engine with keeping good emission.

In order to attain at least part of the above and the other related objects, the internal combustion engine system and the corresponding internal combustion engine control method have the configurations discussed below.

The present invention is directed to an internal combustion engine system including an internal combustion engine that has multiple cylinders. The internal combustion engine system includes: a fuel injection unit that is capable of individually injecting a fuel into an intake system in each of the multiple cylinders of the internal combustion engine; an ignition unit that is capable of individually igniting an air-fuel mixture in each of the multiple cylinders of the internal combustion engine; and a control module that, in response to reception of a stop instruction of the internal combustion engine, controls the fuel injection unit to inject the fuel into a specific cylinder that is expected to stop in a predetermined range including part of a compression stroke, among the multiple cylinders of the internal combustion engine, before a full stop of the internal combustion engine. When the specific cylinder receiving the fuel injection is actually not at a stop in the predetermined range but exceeds the predetermined range, the control module controls the ignition unit to ignite the air-fuel mixture in the specific cylinder at a specified timing. In response to reception of a start instruction of the internal combustion engine, the control module controls the fuel injection unit and the ignition unit to start the internal combustion engine with ignition performed at a first ignition timing in a cylinder that is actually at a stop in the predetermined range.

In the internal combustion engine system of the invention, in response to reception of a stop instruction of the internal combustion engine, the fuel injection unit is controlled to inject the fuel in the specific cylinder that is expected to stop in the predetermined range including part of the compression stroke, among the multiple cylinders of the internal combustion engine, before the full stop of the internal combustion engine. Such control implements the fuel injection into the specific cylinder that is expected to stop in the predetermined range including part of the compression stroke, prior to the full stop of the internal combustion engine. When the specific cylinder receiving the fuel injection is actually not at a stop in the predetermined range but exceeds the predetermined range, the ignition unit is controlled to ignite the air-fuel mixture in the specific cylinder at the specified timing. Such control effectively restrains direct discharge of the uncombusted fuel from the specific cylinder, which was expected to stop in the predetermined range including part of the compression stroke and received the fuel injection, at a restart of the internal combustion engine, thus preventing the poor emission. In response to reception of a start instruction of the internal combustion engine, the fuel injection unit and the ignition unit are controlled to start the internal combustion engine with ignition performed at the first ignition timing in the cylinder that is actually at a stop in the predetermined range. Such control ensures a quick restart of the internal combustion engine.

In one preferable embodiment of the internal combustion engine system of the invention, when the specific cylinder receiving the fuel injection exceeds the predetermined range and reaches a preset position in an expansion stroke, the control module may control the ignition unit to ignite the air-fuel mixture in the specific cylinder at a timing of reaching the preset position as the specified timing. The adequate ignition timing naturally depends upon the crank angle of the internal combustion engine. Ignition at a certain position in the expansion stroke generally enables relatively quiet combustion and reduces the potential vibrations due to the explosive combustion under the stop of the internal combustion engine. The position of igniting the air-fuel mixture is thus desirably set as a crank angle that ensures quiet combustion. In the preferable embodiment of the internal combustion engine system, the control module may control the ignition unit and the fuel injection unit to ignite the air-fuel mixture in the specific cylinder receiving the fuel injection at the specified timing and to simultaneously inject the fuel into a cylinder that is in an intake stroke at a timing of the ignition, before the full stop of the internal combustion engine. This ensures the fuel injection in a cylinder that may enter the predetermined range including part of the compression stroke by rotation of the internal combustion engine accompanied with the ignition in the specific cylinder receiving the fuel injection. The fuel injection is performed into the cylinder that possibly enters the predetermined range, simultaneously with the ignition in the specific cylinder that has received the fuel injection and exceeds the predetermined range. This arrangement ensures a quick restart of the internal combustion engine. In the preferable embodiment of the internal combustion engine system, when the specific cylinder receiving the fuel injection exceeds the predetermined range but does not reach the preset position, the control module may control the ignition unit to ignite the air-fuel mixture in the specific cylinder at a timing after elapse of a preset time period since the full stop of the internal combustion engine as the specified timing. This arrangement effectively restrains direct discharge of the uncombusted fuel from the specific cylinder, which has received the fuel injection and exceeds the predetermined range but does not reach the preset position in the expansion stroke, at a restart of the internal combustion engine, thus preventing the poor emission. The ignition at the timing after elapse of the preset time period since the full stop of the internal combustion engine desirably reduces the potential vibrations due to explosive vibration. The cylinder that exceeds the predetermined range but does not reach the preset position in the expansion stroke has a relatively high compression rate. Ignition in this cylinder immediately after the full stop of the internal combustion engine causes the explosive combustion. The internal pressure of the combustion chamber decreases with the elapse of the preset time period, and ignition after the elapse of the preset time period enables relatively quiet combustion. The specified timing may represent a timing of restarting the internal combustion engine after the full stop of the internal combustion engine.

In the internal combustion engine system of the invention, the internal combustion engine system may further include: a rotation speed measurement unit that measures a rotation speed of the internal combustion engine. In response to reception of the stop instruction of the internal combustion engine, the control module may control the fuel injection unit to prohibit fuel injection until the measured rotation speed of the internal combustion engine reaches a preset fuel injection-start reference rotation speed. The control module may control the fuel injection unit to allow fuel injection while the measured rotation speed of the internal combustion engine varies from the preset fuel injection-start reference rotation speed to a preset fuel injection-stop reference rotation speed. The control module may control the fuel injection unit to prohibit fuel injection again after the measured rotation speed of the internal combustion engine reaches the preset fuel injection-stop reference rotation speed. The control module may thus implement the fuel injection in the specific cylinder that is expected to stop in the predetermined range. Further, the internal combustion engine system may further include: an engine stop position prediction unit that predicts a stop position of the internal combustion engine. In response to reception of the stop instruction of the internal combustion engine, the control module may control the fuel injection unit to inject the fuel at a fuel injection timing immediately before the full stop of the internal combustion engine into a cylinder that is expected to stop in the predetermined range when the internal combustion engine stops at the stop position predicted by the engine stop position prediction unit.

The present invention is also directed to an internal combustion engine control method of controlling an internal combustion engine that has multiple cylinders and is capable of individually injecting a fuel into an intake system in each of the multiple cylinders. The internal combustion engine control method activates and inactivates the internal combustion engine to inject the fuel into a specific cylinder that is expected to stop in a predetermined range including part of a compression stroke, among the multiple cylinders of the internal combustion engine, and when the specific cylinder receiving the fuel injection exceeds the predetermined range, the internal combustion engine control method ignites an air-fuel mixture in the specific cylinder at a specified timing.

When the specific cylinder, which was expected to stop in the predetermined range including part of the compression stroke and received the fuel injection before the full stop of the internal combustion engine, actually exceeds the predetermined range, the internal combustion engine control method of the invention ignites the air-fuel mixture in the specific cylinder at the specified timing. This effectively restrains direct discharge of the uncombusted fuel from the specific cylinder, which was expected to stop in the predetermined range including part of the compression stroke and received the fuel injection, at a restart of the internal combustion engine, thus preventing the poor emission.

In one preferable embodiment of the invention, when the specific cylinder receiving the fuel injection exceeds the predetermined range and reaches a preset position in an expansion stroke, the internal combustion engine control method may ignite the air-fuel mixture in the specific cylinder at a timing of reaching the preset position as the specified timing. When the specific cylinder receiving the fuel injection exceeds the predetermined range but does not reach the preset position, the internal combustion engine control method may ignite the air-fuel mixture in the specific cylinder at a timing after elapse of a preset time period since the full stop of the internal combustion engine as the specified timing. This arrangement ensures quiet combustion and thus desirably reduces the potential vibrations due to the explosive combustion.

In another preferable embodiment of the invention, in response to reception of a start instruction of the internal combustion engine, the internal combustion engine control method may start the internal combustion engine with ignition, which is performed at a first ignition timing in a cylinder that is actually at a stop in the predetermined range, based on a measured crank angle. Such control ensures a quick restart of the internal combustion engine.

BEST MODES OF CARRYING OUT THE INVENTION

Figure 1:
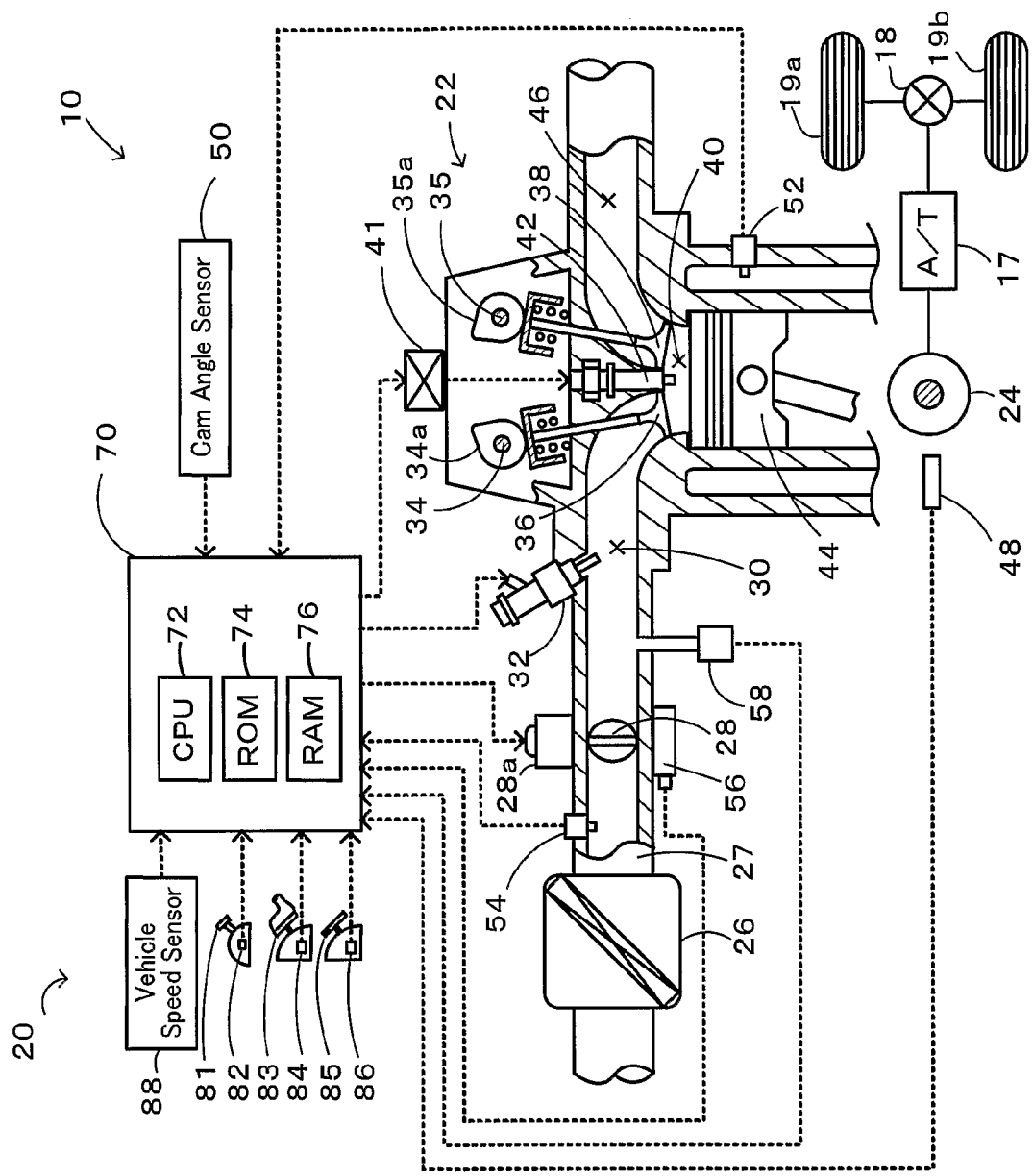
FIG. 1 schematically illustrates the configuration of a motor vehicle equipped with an internal combustion engine system in one embodiment of the invention.

One mode of carrying out the invention is described below as a preferred embodiment. FIG. 1 schematically illustrates the configuration of a motor vehicle 10 equipped with an internal combustion engine system 20 in one embodiment of the invention. As illustrated, the motor vehicle 10 includes an engine 22 driven with gasoline, an engine electronic control unit (hereafter referred to as engine ECU) 70 that controls the engine 22, an automatic transmission (AT) 17 that converts power of a crankshaft 24 of the engine 22 and outputs the converted power to drive wheels 19a and 19b via a differential gear 18, and an AT electronic control unit (not shown) that controls the automatic transmission 17. The engine 22 and the engine ECU 70 constitute the internal combustion engine system 20 of the embodiment.

Figure 2:
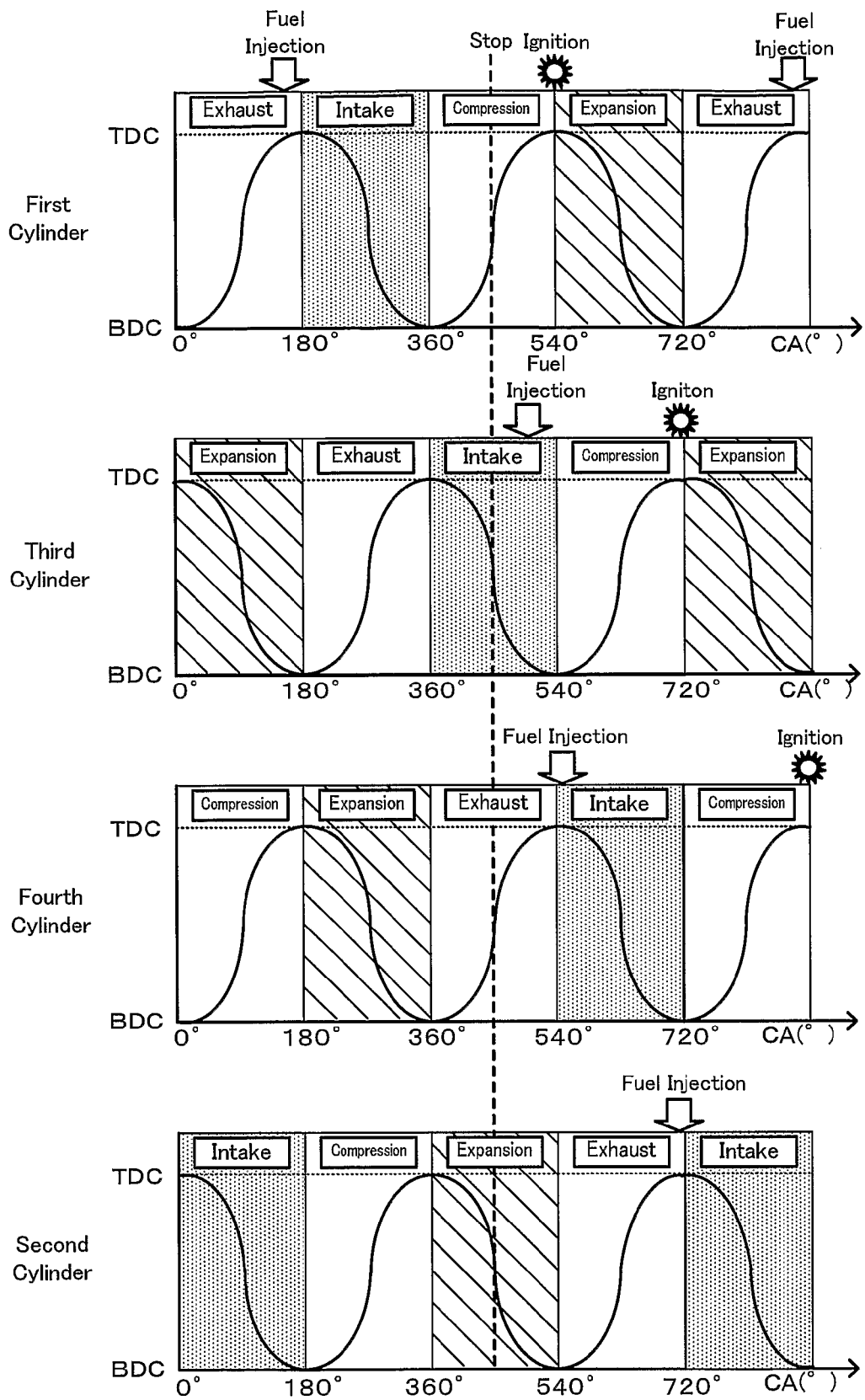
FIG. 2 shows fuel injection and ignition with a change of a crank angle CA in four strokes in four cylinders of an engine included in the internal combustion engine system of the embodiment.

The engine 22 is an individual-injection-type 4-cylinder engine that is capable of individually injecting a fuel in respective cylinders 22a to 22d of an intake manifold 30. Each of the four cylinders 22a to 22d in the engine 22 is driven in a cycle including an intake stroke, a compression stroke, an expansion stroke (combustion stroke), and an exhaust stroke. The first cylinder 22a, the second cylinder 22b, the third cylinder 22c, and the fourth cylinder 22d are arranged in series in this sequence, while the first cylinder 22a, the third cylinder 22c, the fourth cylinder 22d, and the second cylinder 22b are linked to the crankshaft 24 to have different crank angles CA by 180 degrees in this sequence. FIG. 2 shows variations of the crank angle CA in four strokes of the respective cylinders 22a to 22d. FIG. 2 also shows a fuel injection timing in engine stop control and a fuel injection timing and an ignition timing in an engine start control, which will be discussed later.

The engine 22 has an air cleaner 26 that cleans the intake air, a throttle valve 28 that is attached to an intake pipe 27 and is driven by a throttle motor 28a to regulate the amount of intake air, fuel injection valves 32 that are attached to branches of the intake manifold 30 diverging corresponding to the four cylinders 22a to 22d to individually inject a fuel, that is, gasoline, in the respective cylinders 22a to 22d, and an intake valve 36 that is driven by a cam 34a of a cam shaft 34 rotating at a ratio of 1 rotation to 2 rotations of the crankshaft 24 to introduce the mixture of gasoline and the air (the air-fuel mixture) into respective combustion chambers 40. The engine 22 also includes an ignition plug 42 that applies a voltage to an ignition coil 41 integrated with an igniter at a timing from a compression stroke to an expansion stroke to generate an electric spark in the combustion chamber 40, an exhaust valve 38 that is driven by a cam 35a of a cam shaft 35 rotating at a ratio of 1 rotation to 2 rotations of the crankshaft 24 to discharge the combustion exhaust gas from the combustion chamber 40 into an exhaust manifold 46, and a catalytic converter (not shown) of a three-way catalyst that converts toxic compounds in the exhaust gas, that is, carbon monoxide (CO), hydrocarbons (HC), and nitrogen oxides (NOx). The reciprocating motions of a piston 44 pressed down by the energy of explosive combustion of the air-fuel mixture in the combustion chamber 40 are converted into the rotating motions of the crankshaft 24.

A crank angle sensor 48 is mounted on the crankshaft 24 of the engine 22 to measure a crank angle CA as a rotation angle of the crankshaft 24. A cam angle sensor 50 is mounted on each of the cam shafts 34 and 35 to measure a cam angle as a rotation angle of the cam shaft 34 or 35. The engine 22 is also equipped with various sensors to observe the current operating conditions of the engine 22. Such sensors include a water temperature sensor 52 that measures the temperature of cooling water in the engine 22, an intake air temperature sensor 54 that measures the temperature of the intake air, a throttle valve position sensor 56 that detects the position of the throttle valve 28 or the throttle position, and a vacuum sensor 58 that measures the flow of the intake air as the load of the engine 22. Signals of these sensors are input into the engine ECU 70. The crank angle sensor 48 is an MRE rotation sensor having a magnetoresistive element arranged at a position to face a magnet rotor (not shown) attached to the crankshaft 24. The crank angle sensor 48 generates a pulse indicating the rotational direction at every preset angle (for example, at every crank angle CA of 10 degrees). In the structure of this embodiment, the engine ECU 70 determines the crank angle CA in response to the pulses generated by the crank angle sensor 48 and computes a rotation speed Ne of the engine 22.

The engine ECU 70 is constructed as a microcomputer including a CPU 72, a ROM 74 that stores processing programs, a RAM 76 that temporarily store data, input and output ports (not shown), and a communication port (not shown). The engine ECU 70 receives, via its input port, signals from the various sensors, that is, the crank angle CA from the crank angle sensor 48, the cam angles from the cam angle sensors 50, the temperature of cooling water from the water temperature sensor 52, the temperature of the intake air from the intake air temperature sensor 54, the throttle position from the throttle valve position sensor 56, and the amount of intake air from the vacuum sensor 58. The engine ECU 70 also receives, via its input port, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 88. The engine ECU 70 outputs, via its output port, driving signals to the fuel injection valves 32 and to the throttle motor 28a that adjusts the position of the throttle valve 28, as well as control signals to the ignition coil 41.

The description now regards the operations of the internal combustion engine system 20 mounted on the motor vehicle 10 of the embodiment having the configuration discussed above, especially a series of engine stop control at an idle stop of the engine 22. In the motor vehicle 10 of the embodiment, the engine 22 automatically stops under preset auto stop conditions, for example, the vehicle speed V equal to 0 and the driver's depression of the brake pedal 85. The engine 22 automatically starts under preset auto restart conditions, for example, the driver's release of the depressed brake pedal 85 after an auto stop of the engine 22. The auto stop control and the auto start control of the engine 22 are not characteristic of the invention and are thus not described in detail.

Figure 3:
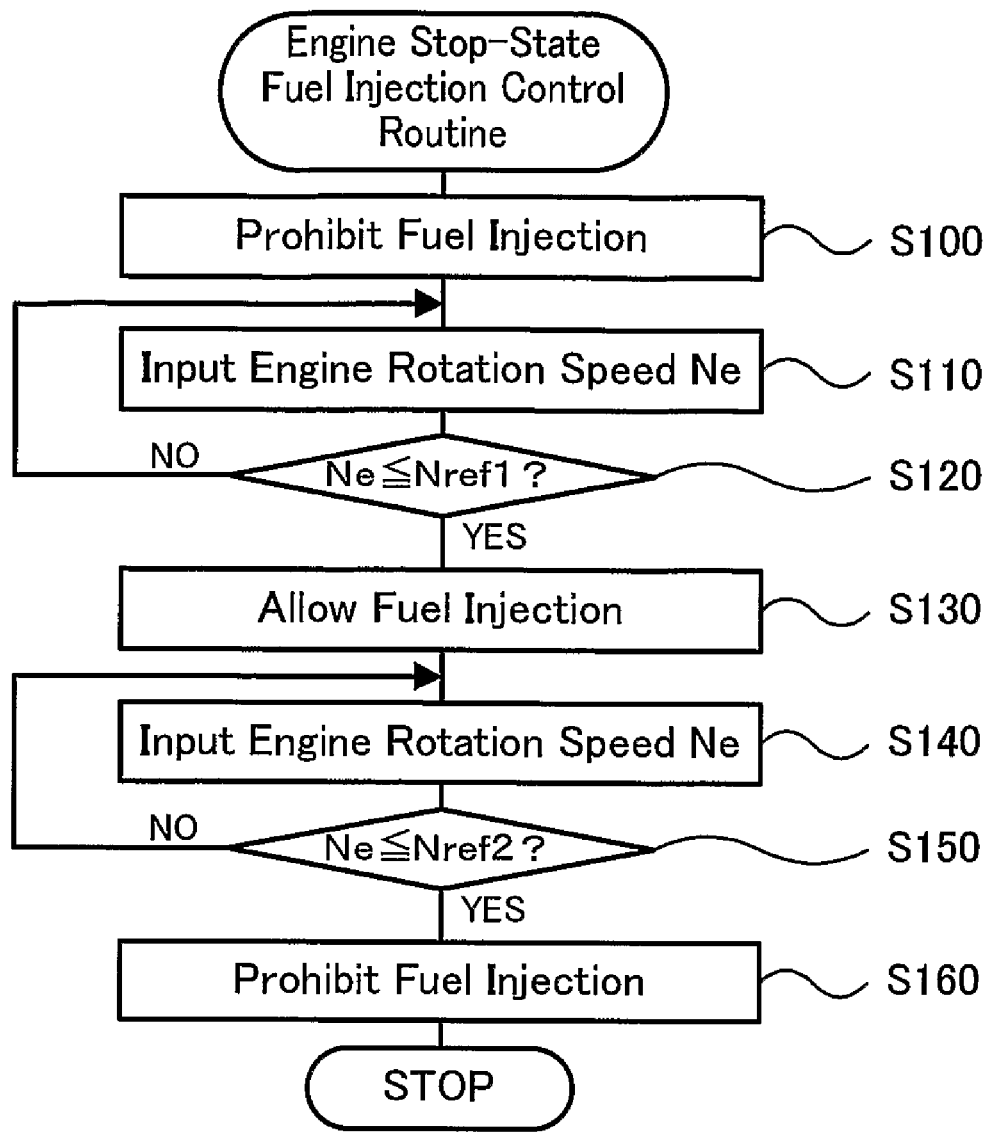
FIG. 3 is a flowchart showing an engine stop-state fuel injection control routine executed by an engine ECU included in the internal combustion engine system of the embodiment.
Figure 4:
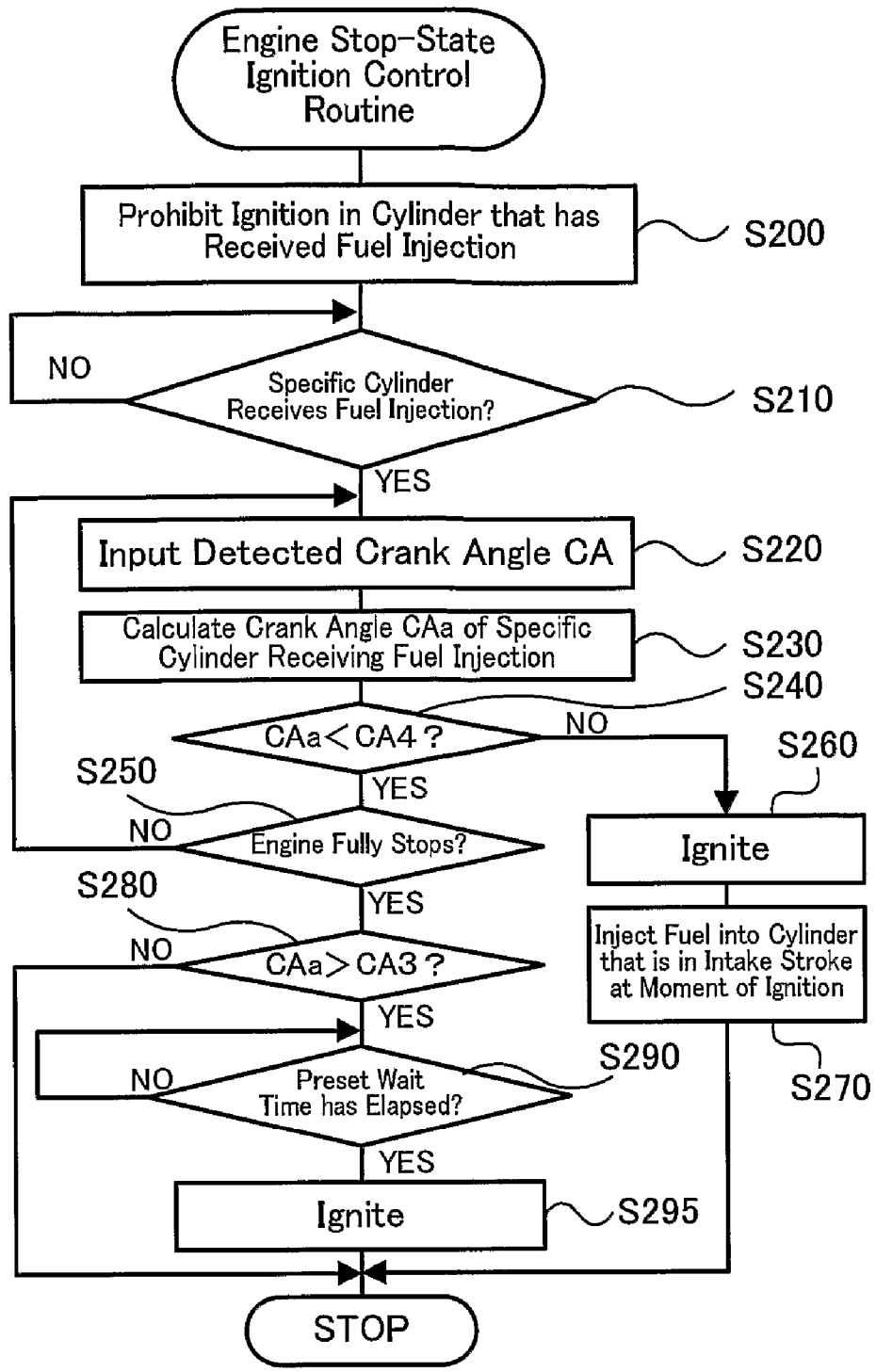
FIG. 4 is a flowchart showing an engine stop-state ignition control routine executed by the engine ECU.

FIG. 3 is a flowchart showing an engine stop-state fuel injection control routine executed by the engine ECU 70 upon satisfaction of preset automatic engine stop conditions. FIG. 4 is a flowchart showing an engine stop-state ignition control routine executed by the engine ECU 70 upon satisfaction of the preset automatic engine stop conditions. The description regards series of fuel injection control and ignition control in an automatic stop of the engine 22 in this sequence with reference to the engine stop-state fuel injection control routine and the engine stop-state ignition control routine of FIGS. 3 and 4.

Figure 5:
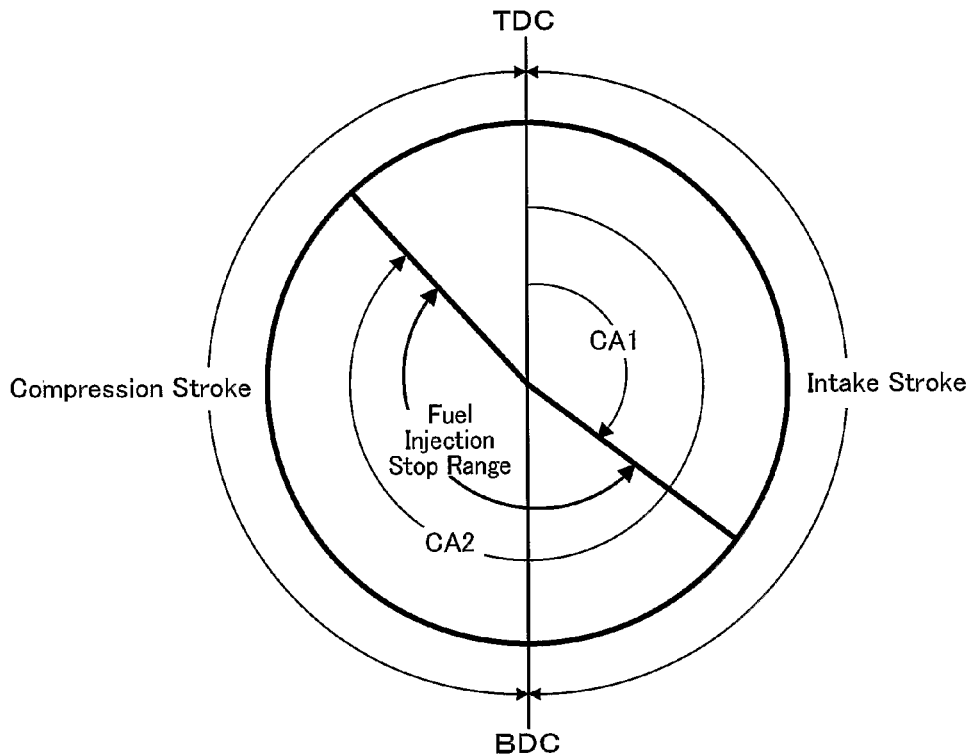
FIG. 5 shows one example of a fuel injection stop range.

In the engine stop-state fuel injection control routine of FIG. 3, the CPU 72 of the engine ECU 70 first prohibits fuel injection into the respective cylinders 22a to 22d (step S100). The prohibition of fuel injection cuts off the fuel supply and thereby lowers the rotation speed Ne of the engine 22. The CPU 72 waits until the input rotation speed Ne of the engine 22 decreases to or below a preset fuel injection-start reference rotation speed Nref1 (steps S110 and S120). When the rotation speed Ne is lowered to or below the fuel injection-start reference rotation speed Nref1, the CPU 72 allows fuel injection (step S130). In this embodiment, the rotation speed Ne of the engine 22 is input after computation from the pulses generated by the crank angle sensor 48 according to an engine rotation speed computation routine (not shown). The rotation speed Ne of the engine 22 may otherwise be computed from input data of the pulses generated by the crank angle sensor 48 in this engine stop-state fuel injection control routine. The fuel injection-start reference rotation speed Nref1 is set as a maximum rotation speed that allows fuel injection into a selected cylinder immediately before a full stop of the engine 22. The selected cylinder stops at its crank angle CA in a range between a preset first angle CA1 and a preset second angle CA2 (hereafter referred to as fuel injection stop range) over the intake stroke to the compression stroke in a stop of the engine 22. FIG. 5 shows one example of the fuel injection stop range. The fuel injection stop range is set to enable combustion of the air-fuel mixture at a first ignition timing (close to a top dead center TDC in the compression stroke) for a restart of the engine 22 after a stop of the engine 22 and to quickly raise the rotation speed Ne of the engine 22. In this embodiment, the fuel injection stop range is between the first angle CA1 in the latter half of the intake stroke and the second angle CA2 in the latter half of the compression stroke. In response to permission of fuel injection, the engine ECU 70 activates the fuel injection valve 32 to inject the fuel into a cylinder having a fuel injection timing in the final phase of the exhaust stroke. The CPU 72 waits until the input rotation speed Ne of the engine 22 further decreases to or below a preset fuel injection-stop reference rotation speed Nref2 (steps S140 and S150). When the rotation speed Ne is lowered to or below the fuel injection-stop reference rotation speed Nref2, the CPU 72 prohibits fuel injection (step S160). After the prohibition of fuel injection, the CPU 72 terminates the engine stop-state fuel injection control routine. The fuel injection-stop reference rotation speed Nref2 is set as a minimum rotation speed that allows fuel injection into the selected cylinder, which stops in the fuel injection stop range in a stop of the engine 22, immediately before the full stop of the engine 22. Execution of this engine stop-state fuel injection control enables a specific cylinder that is expected to stop in the fuel injection stop range in a stop of the engine 22 to receive fuel injection before the full stop of the engine 22.

Figure 6:
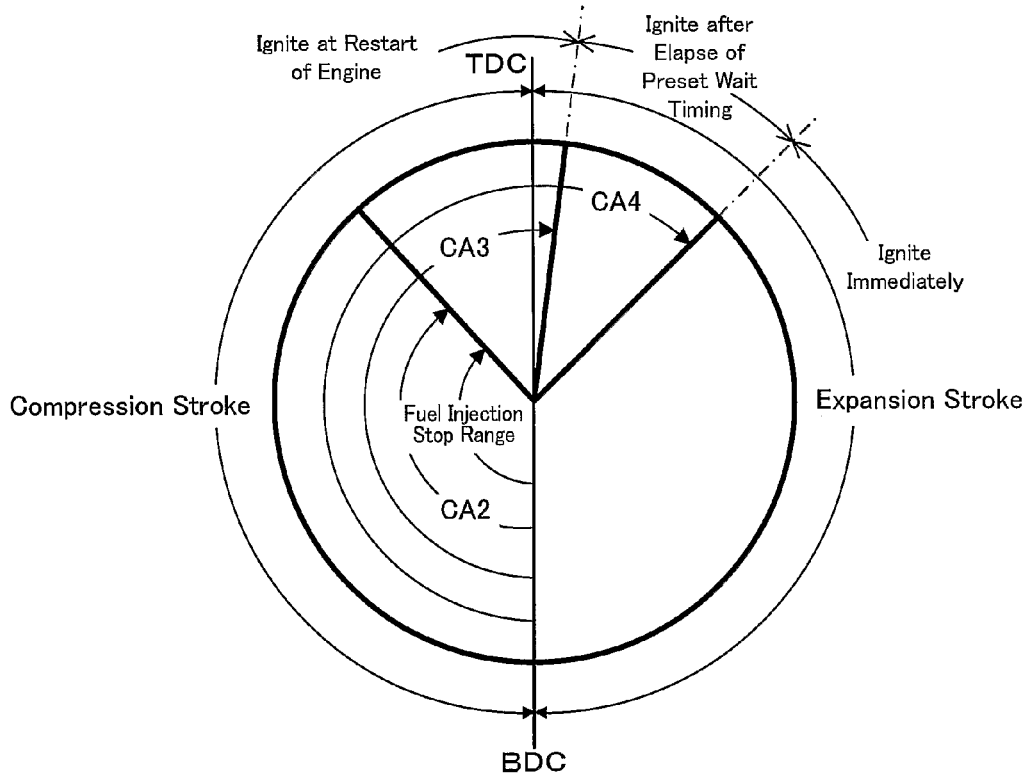
FIG. 6 shows a reference angle CA4 relative to the fuel injection stop range.

In the engine stop-state ignition control routine of FIG. 4, the CPU 72 of the engine ECU 70 first controls the ignition plug 42 to prohibit ignition of the air-fuel mixture in any cylinder that has received the fuel injection (step S200), synchronously with the prohibition of fuel injection at step S100 in the engine stop-state fuel injection control routine of FIG. 3. The CPU 72 then waits until implementation of fuel injection into a specific cylinder that is expected to stop in the fuel injection stop range (step S210). On the fuel injection into the specific cylinder, the CPU 72 inputs the detected crank angle CA from the crank angle sensor 48 (step S220), calculates a crank angle CAa of the specific cylinder receiving the fuel injection (step S230), and compares the calculated crank angle CAa with a preset reference angle CA4 (step S240). The processing of steps S220 to S240 is repeated until a full stop of the engine 22 (step S250). The crank angle CAa of the specific cylinder receiving the fuel injection is calculated, for example, by setting an angle of 0 degree to a top dead center TDC in the intake stroke of the specific cylinder. The reference angle CA4 is set as a crank angle in the expansion stroke that causes quiet combustion by an ignition in the specific cylinder receiving the fuel injection. FIG. 6 shows the reference angle CA4 relative to the fuel injection stop range. In this embodiment, the reference angle CA4 exceeds the fuel injection stop range to be about 30 to 60 degrees advanced from the top dead center TDC over the compression stroke to the expansion stroke. Another reference angle CA3 shown in FIG. 6 exceeds the fuel injection stop range to be set as a desired ignition angle at a stop of the engine 22. In this embodiment, the reference angle CA3 is about 10 degrees advanced from the top dead center TDC over the compression stroke to the expansion stroke. The angles CA2, CA3, and CA4 accordingly increase in this sequence (CA2<CA3<CA4). As described previously, the fuel is injected into the specific cylinder that is expected to stop in the fuel injection stop range in a stop of the engine 22. Namely the crank angle CAa of the specific cylinder receiving the fuel injection is normally between the preset first angle CA1 and the preset second angle CA2. The processing loop of steps S220 to S250 thus normally repeats the calculation of the crank angle CAa of the specific cylinder receiving the fuel injection and the comparison between the calculated crank angle CAa and the preset reference angle CA4 until the stop of the engine 22. On the full stop of the engine 22 at step S250, the calculated crank angle CAa of the specific cylinder receiving the fuel injection is compared with the preset reference angle CA3 (step S280). When the calculated crank angle CAa is not greater than the preset reference angle CA3 at step S280, the CPU 72 exits from the engine stop-state ignition control routine of FIG. 4 without any further processing. FIG. 2 shows fuel injection in the first cylinder 22a that stops in the fuel injection stop range at a stop of the engine 22, as well as fuel injection and ignition at a restart of the engine 22. In the illustrated example of FIG. 2, the first cylinder 22a receives the fuel injection in the final phase of the exhaust stroke before a stop of the engine 22. The engine 22 actually stops at the crank angle CA of approximately 90 degrees in the compression stroke of the first cylinder 22a.

Figure 7:
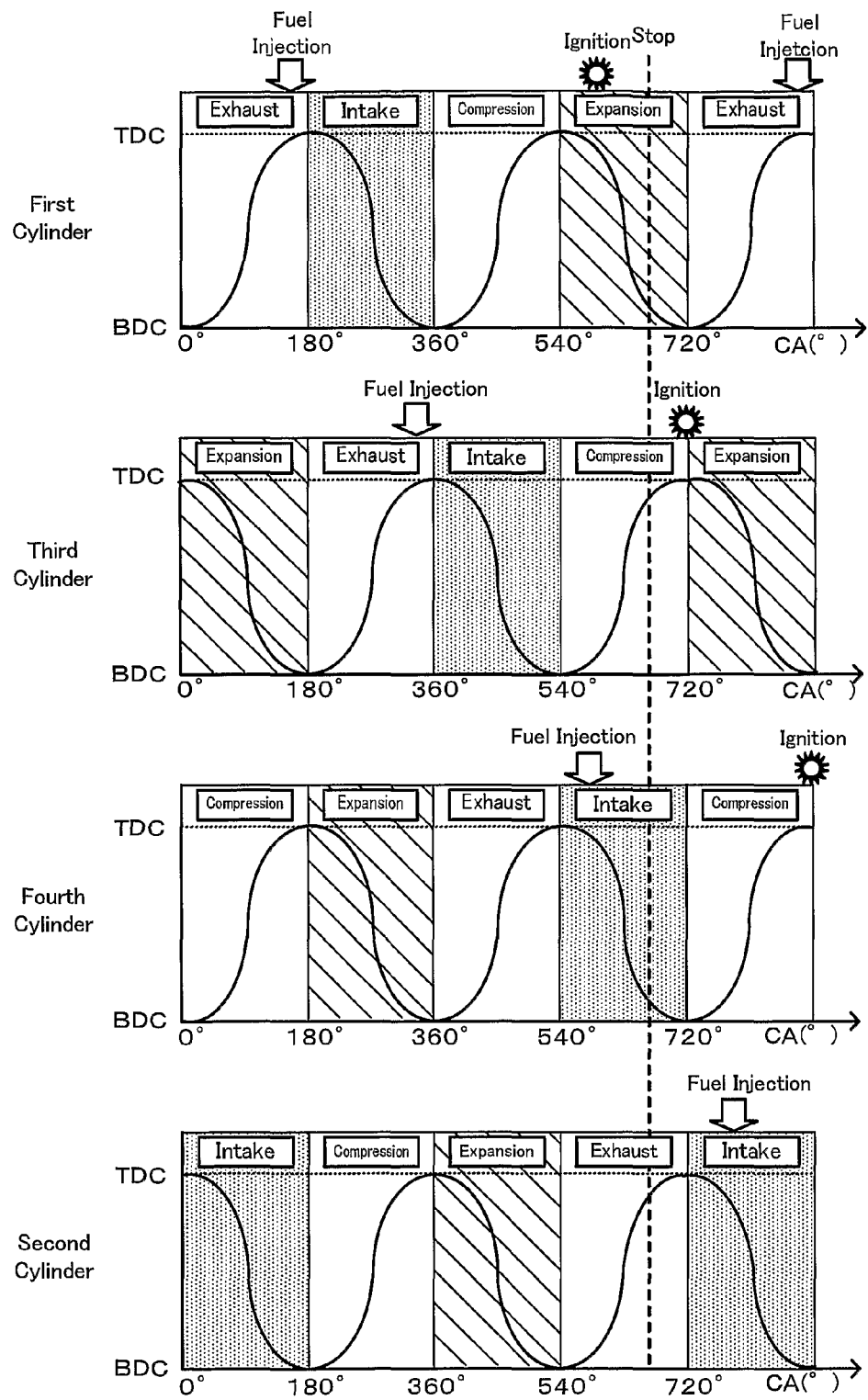
FIG. 7 shows fuel injection and ignition with another change of the crank angle CA in the four strokes in the four cylinders of the engine.

In the course of the repeated processing of steps S220 to S250, when the calculated crank angle CAa of the specific cylinder receiving the fuel injection reaches the preset reference angle CA4 (step S240), the engine ECU 70 controls the ignition plug 42 to ignite the air-fuel mixture in the specific cylinder receiving the fuel injection (step S260) and activates the fuel injection valve 32 to inject the fuel into a cylinder that is in the intake stroke at the moment of the ignition (step S270). The CPU 72 then terminates the engine stop-state ignition control routine of FIG. 4. The cylinder having the ignition has the lowered compression rate. The lowered compression rate causes quiet combustion of the air-fuel mixture in the cylinder to give only small combustion energy of rotating the engine 22. This stops the engine 22 after slight rotation by only a small crank angle. The cylinder newly receiving the fuel injection accordingly stops in the fuel injection stop range over the intake stroke to the compression stroke. FIG. 7 shows fuel injection and ignition in the first cylinder 22a, which has received the fuel injection on the assumption of a stop in the fuel injection stop range but actually makes its crank angle CAa reach the preset reference angle CA4 at a stop of the engine 22, as well as fuel injection and ignition at a restart of the engine 22. In the illustrated example of FIG. 7, the fuel is injected into the fourth cylinder 22d that is in the intake stroke at the moment of the ignition in the expansion stroke of the first cylinder 22a. The third cylinder 22c receives the fuel injection in the final phase of the exhaust stroke, as the third cylinder 22c is expected to stop in the fuel injection strop range at the stop of the engine 22. Ignition in the specific cylinder receiving the fuel injection is performed when the crank angle CAa of the specific cylinder reaches the preset reference angle CA4. This effectively restrains direct discharge of the uncombusted fuel at a restart of the engine 22 and thus prevents the poor emission. The ignition in the specific cylinder receiving the fuel injection is performed at the crank angle CA in the expansion stroke. This ensures quiet combustion, thus reducing the potential vibrations due to the explosive combustion and preventing the driver from feeling uncomfortable.

Figure 8:
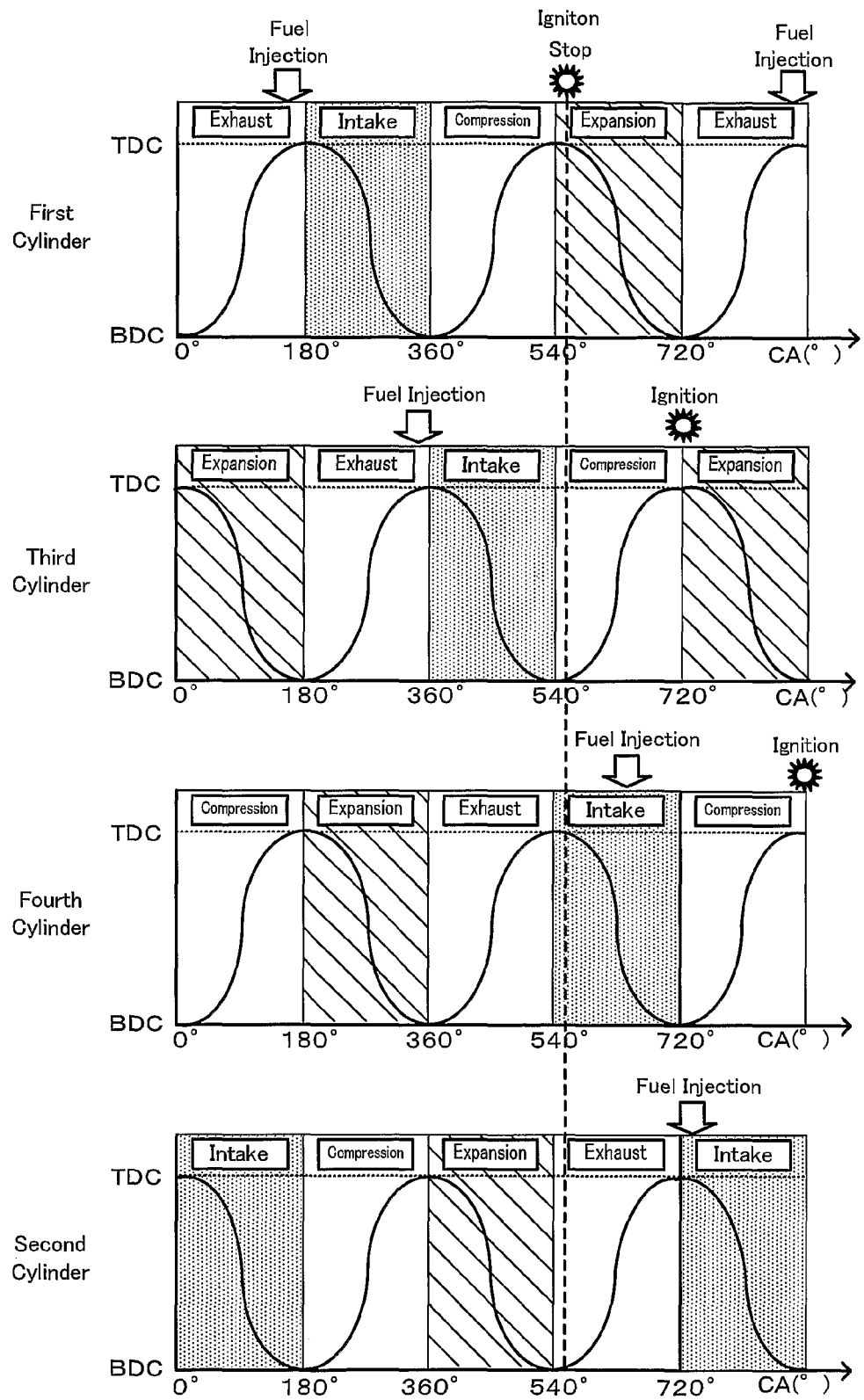
FIG. 8 shows fuel injection and ignition with still another change of the crank angle CA in the four strokes in the four cylinders of the engine.

In another example, the engine 22 stops when the crank angle CAa of the specific cylinder receiving the fuel injection does not reach the preset reference angle CA4 but exceeds the preset reference angle CA3. This gives an affirmative answer at step S280. The CPU 72 waits until a preset wait time has elapsed since the stop of the engine 22 (step S290), and ignites the air-fuel mixture in the specific cylinder receiving the fuel injection (step S295). The CPU 72 then terminates the engine stop-state ignition control routine of FIG. 4. The wait time represents a time period required for sufficient reduction of the internal pressure of the combustion chamber 40 in the specific cylinder receiving the fuel injection and is set, for example, equal to 2 seconds, 3 seconds, or 5 seconds. Ignition upon the preset wait time elapsed after the stop of the engine 22 enables quiet combustion of the air-fuel mixture in the specific cylinder receiving the fuel injection. FIG. 8 shows fuel injection and ignition in the first cylinder 22a, which has received the fuel injection on the assumption of a stop in the fuel injection stop range but actually makes its crank angle CAa not reach the preset reference angle CA4 but exceed the preset reference angle CA3 at a stop of the engine 22, as well as fuel injection and ignition at a restart of the engine 22. In the illustrated example of FIG. 8, ignition in the first cylinder 22a is performed at its stop position after the stop of the engine 22. The third cylinder 22c receives the fuel injection in the final phase of the exhaust stroke, as the third cylinder 22c is expected to stop in the fuel injection strop range at the stop of the engine 22. Ignition in the specific cylinder receiving the fuel injection is performed after the stop of the engine 22 when the crank angle CAa of the specific cylinder does not reach the preset reference angle CA4 but exceeds the preset reference angle CA3. This effectively restrains direct discharge of the uncombusted fuel at a restart of the engine 22 and thus prevents the poor emission. The ignition in the specific cylinder receiving the fuel injection is performed upon the preset wait time elapsed after the stop of the engine 22. This ensures quiet combustion, thus reducing the potential vibrations due to the explosive combustion and preventing the driver from feeling uncomfortable.

Figure 9:
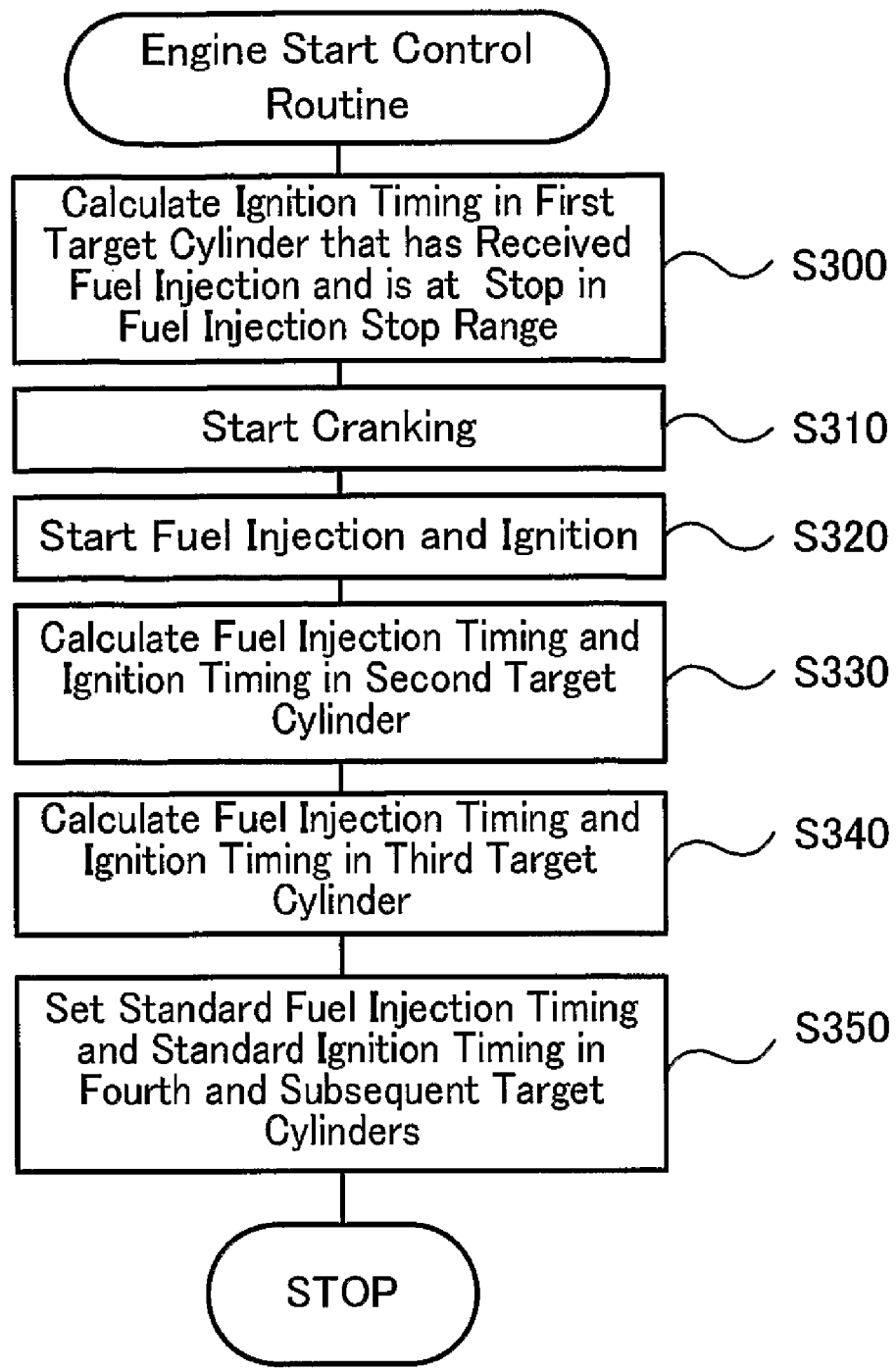
FIG. 9 is a flowchart showing an engine start control routine executed by the engine ECU.

FIG. 9 is a flowchart showing an engine start control routine executed by the engine ECU 70 upon satisfaction of preset automatic engine start conditions. In the engine start control routine of FIG. 9, the CPU 72 of the engine ECU 70 first calculates an ignition timing in a first target cylinder that has received fuel injection and is actually at a stop in the fuel injection stop range, based on the crank angle CA in a stop of the engine 22 (step S300). When a specific cylinder, which was expected to stop in the fuel injection stop range and received the fuel injection, is actually at a stop in the fuel injection stop range, the engine start control routine calculates the ignition timing in the specific cylinder as the first target cylinder (the first cylinder 22a in the illustrated example of FIG. 2). When a specific cylinder, which was expected to stop in the fuel injection stop range and received the fuel injection, has its crank angle CAa exceed the fuel injection stop range and has accordingly been ignited, on the other hand, the engine start control routine calculates the ignition timing in another cylinder that is actually at a stop in the fuel injection stop range as the first target cylinder (the third cylinder 22c in the illustrated examples of FIGS. 7 and 8). The CPU 72 then initiates cranking (step S310), activates the fuel injection valve 32 and the ignition plug 42 to start fuel injection and ignition (step S320), and calculates a fuel injection timing and an ignition timing in a second target cylinder, which has an ignition timing after the first target cylinder stopping in the fuel injection stop range (step S330). In one example shown in FIG. 2, a restart of the engine 22 is assumed in the state where the first cylinder 22a has received fuel injection and has stopped at the crank angle CA of approximately 90 degrees in the compression stroke in the fuel injection stop range. In this state, the third cylinder 22c as the second target cylinder having the ignition timing after the first cylinder 22a has stopped at the crank angle CA of approximately 90 degrees in the intake stroke and has received no fuel injection. For combustion of the air-fuel mixture at a first ignition timing in the third cylinder 22c, it is required to inject the fuel in the course of the intake stroke and to introduce the injected fuel into the combustion chamber 40. The calculation at step S330 thus sets the timing of fuel injection before the end of the intake stroke in the third cylinder 22c. In another example, a restart of the engine 22 is assumed in the state where the first cylinder 22a has received fuel injection and has stopped at the crank angle CA close to the preset second angle CA2 in the compression stroke in the fuel injection stop range. In this state, the third cylinder 22c as the second target cylinder having the ignition timing after the first cylinder 22a has stopped in the intake stroke in the fuel injection stop range and has received fuel injection. The calculation at step S330 thus specifies no requirement of fuel injection into the third cylinder 22c as the second target cylinder. In still another example shown in FIG. 7, a restart of the engine 22 is assumed in the state where the first cylinder 22a has received fuel injection but has significantly exceeded the fuel injection stop range to be ignited in the expansion stroke. In this state, the fourth cylinder 22d as the second target cylinder having the ignition timing after the third cylinder 22c has received fuel injection, simultaneously with the ignition in the first cylinder 22a. The calculation at step S330 thus specifies no requirement of fuel injection into the fourth cylinder 22d as the second target cylinder. In another example shown in FIG. 8, a restart of the engine 22 is assumed in the state where the first cylinder 22a has received fuel injection but has exceeded the fuel injection stop range to be ignited after a full stop of the engine 22. In this state, the fourth cylinder 22d as the second target cylinder having the ignition timing after the third cylinder 22c has received no fuel injection. The calculation at step S330 thus sets the timing of fuel injection before the end of the intake stroke in the fourth cylinder 22d. The CPU 72 subsequently calculates a fuel injection timing and an ignition timing in a third target cylinder having a third ignition timing (step S340), and sets a standard fuel injection timing and a standard ignition timing in fourth and subsequent target cylinders having fourth and subsequent ignition timings (step S350). The engine start control routine is terminated after the processing of step S350. The engine start control calculates the fuel injection timing and the ignition timing and performs fuel injection and ignition respectively at the calculated fuel injection timing and at the calculated ignition timing. Such control enables combustion of the air-fuel mixture in the first target cylinder that has received fuel injection and stopped in the fuel injection stop range, as well as combustion in the subsequent cylinders having subsequent ignition timings, in a restart of the engine 22. The combustion energy is thus effectively usable to raise the rotation speed Ne of the engine 22. This ensures a quick start of the engine 22.

In the internal combustion engine system 20 of the embodiment described above, when the specific cylinder receiving the fuel injection exceeds the fuel injection stop range, the engine stop-state ignition control ignites the air-fuel mixture in the specific cylinder for combustion. This effectively restrains direct discharge of the uncombusted fuel at a restart of the engine 22 and thus prevents the poor emission. The engine stop-state ignition control immediately performs the ignition in the specific cylinder when the crank angle CAa of the specific cylinder receiving the fuel injection reaches the preset reference angle CA4. The engine stop-state ignition control performs the ignition in the specific cylinder after the full stop of the engine 22, on the other hand, when the crank angle CAa of the specific cylinder receiving the fuel injection does not reach the preset reference angle CA4 but exceeds the preset reference angle CA3. This ensures quiet combustion, thus reducing the potential vibrations due to the explosive combustion and preventing the driver from feeling uncomfortable. When the crank angle CAa of the specific cylinder receiving the fuel injection reaches the preset reference angle CA4, the engine stop-state ignition control ignites the air-fuel mixture in the specific cylinder and simultaneously injects the fuel into a certain cylinder that is in the intake stroke at the moment of the ignition. Ignition in the certain cylinder at a restart of the engine 22 generates the combustion energy to raise the rotation speed Ne of the engine 22. This ensures a quick start of the engine 22. The control procedure of the embodiment performs the fuel injection into the specific cylinder that is expected to stop in the fuel injection stop range, before the full stop of the engine 22.

In an auto restart of the engine 22, the internal combustion engine system 20 of the invention calculates the ignition timing of the first target cylinder at a stop in the fuel injection stop range and the fuel injection timing and the ignition timing of the second and the third target cylinders having the second and the third ignition timings, and performs fuel injection and ignition at the calculated respective fuel injection timings and ignition timings. Such control ensures ignition and combustion of the air-fuel mixture in the first target cylinder that has received fuel injection and has stopped in the fuel injection stop range, as well as ignition and combustion in the subsequent target cylinders having the subsequent ignition timings, in the restart of the engine 22. The combustion energy is thus effectively usable to raise the rotation speed Ne of the engine 22. This ensures a quick start of the engine 22.

Figure 10:
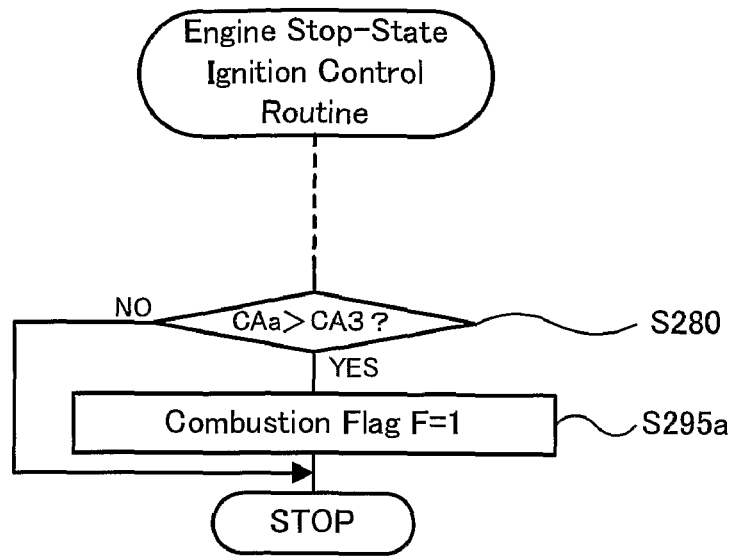
FIG. 10 is a flowchart showing a modified flow of the engine stop-state ignition control routine.
Figure 11:
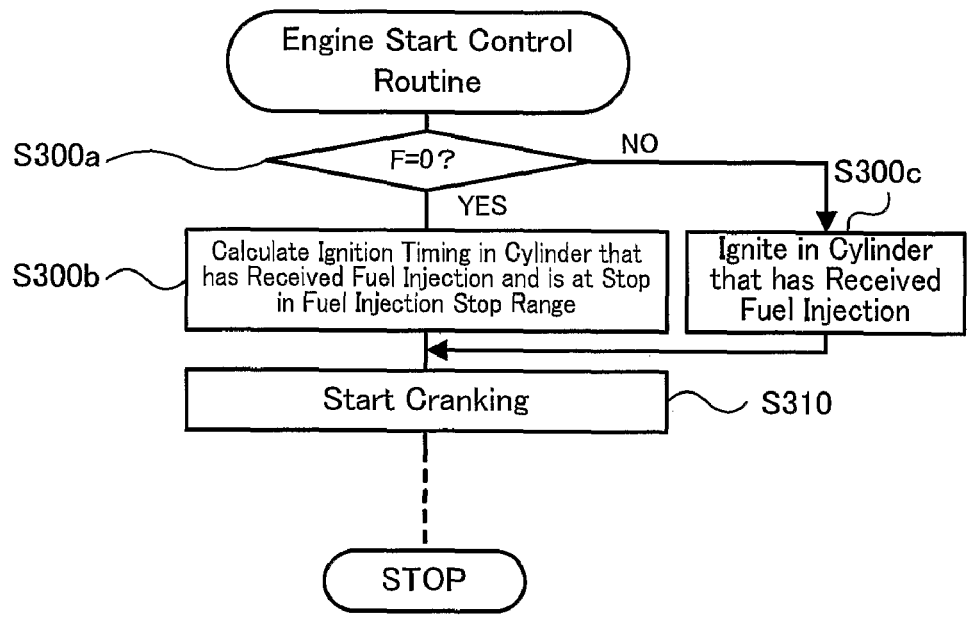
FIG. 11 is a flowchart showing a modified flow of the engine start control routine.

In the internal combustion engine system 20 of the embodiment, when the crank angle CAa of the specific cylinder receiving the fuel injection does not reach the preset reference angle CA4 but exceeds the preset reference angle CA3, the engine stop-state ignition control ignites the air-fuel mixture in the specific cylinder upon the preset wait time elapsed after the stop of the engine 22. One modified control procedure may not ignite the air-fuel mixture in the specific cylinder at a stop of the engine 22 but may perform the ignition in the specific cylinder at a restart of the engine 22. In this case, the engine stop-state ignition control routine of FIG. 4 and the engine start control routine of FIG. 9 are replaced respectively by a modified engine stop-state ignition control routine of FIG. 10 and a modified engine start control routine of FIG. 11. The modified flow of the engine stop-state ignition control sets a value '1' to a combustion flag F (step S295a), instead of the ignition upon the preset wait time elapsed after the stop of the engine 22 (steps S290 and S295), when the crank angle CAa of the specific cylinder receiving the fuel injection exceeds the preset reference angle CA3 (step S280). The modified flow of the engine start control first identifies the value of the combustion flag F (step S300a). When the combustion flag F is equal to 0 at step S300a, the modified flow calculates an ignition timing in a first target cylinder that has received the fuel injection and is actually at a stop in the fuel injection stop range (step S300b), prior to the processing of and after step S310. When the combustion flag F is equal to 1 at step S300a, on the other hand, the modified flow ignites the air-fuel mixture in a cylinder that has received the fuel injection and has the crank angle CAa exceed the preset reference angle CA3 (step S300c), prior to the processing of and after step S310. This modified arrangement also effectively restrains direct discharge of the uncombusted fuel at a restart of the engine 22 and thus prevents the poor emission.

In the internal combustion engine system 20 of the embodiment, when the crank angle CAa of the specific cylinder receiving the fuel injection reaches the preset reference angle CA4, the engine stop-state ignition control ignites the air-fuel mixture in the specific cylinder and simultaneously injects the fuel into a certain cylinder that is in the intake stroke at the moment of the ignition. One possible modification of the engine stop-state ignition control may not simultaneously inject the fuel into the certain cylinder that is in the intake stroke at the moment of the ignition in the specific cylinder.

In the internal combustion engine system 20 of the embodiment, the fuel injection is allowed while the rotation speed Ne of the engine 22 decreases from the preset fuel injection-start reference rotation speed Nref1 to or below the preset fuel injection-stop reference rotation speed Nref2. The fuel is accordingly injected before a stop of the engine 22 into the specific cylinder that is expected to stop in the fuel injection stop range between the preset first angle CA1 and the preset second angle CA2 in a stop of the engine 22. One possible modification may predict the stop position of the engine 22 according to the rotations speed Ne of the engine 22 and identify the cylinder, which is estimated to stop in the fuel injection stop range, based on the predicted stop position of the engine 22. The fuel is then injected into the identified cylinder before the full stop of the engine 22.

In the internal combustion engine system 20 of the embodiment, the fuel injection stop range is set as an area over the intake stroke to the compression stroke. The fuel injection stop range may be limited to an area within the compression stroke.

The embodiment discussed above is to be considered in all aspects as illustrative and not restrictive. There may be many modifications, changes, and alterations without departing from the scope or spirit of the main characteristics of the present invention. All changes within the meaning and range of equivalency of the claims are intended to be embraced therein.

INDUSTRIAL APPLICABILITY

The technique of the invention is preferably adopted in manufacturing industries of internal combustion engine systems.

The invention claimed is:
1. An internal combustion engine system including an internal combustion engine that has multiple cylinders, said internal combustion engine system comprising:

a fuel injection unit that is capable of individually injecting a fuel into an intake system in each of the multiple cylinders of the internal combustion engine;

an ignition unit that is capable of individually igniting an air-fuel mixture in each of the multiple cylinders of the internal combustion engine; and a control module that, in response to reception of a stop instruction of the internal combustion engine, controls the fuel injection unit to inject the fuel into a specific cylinder that is expected to stop in a predetermined range including part of a compression stroke, among the multiple cylinders of the internal combustion engine, before a full stop of the internal combustion engine, when the specific cylinder receiving the fuel injection is actually not at a stop in the predetermined range but exceeds the predetermined range, said control module controlling the ignition unit to ignite the air-fuel mixture in the specific cylinder at a specified timing, in response to reception of a start instruction of the internal combustion engine, said control module controlling the fuel injection unit and the ignition unit to start the internal combustion engine with ignition performed at a first ignition timing in a cylinder that is actually at a stop in the predetermined range, wherein when the specific cylinder receiving the fuel injection exceeds the predetermined range and reaches a preset position in an expansion stroke, said control module controlling the ignition unit to ignite the air-fuel mixture in the specific cylinder at a timing of reaching the preset position as the specified timing, and when the specific cylinder receiving the fuel injection exceeds the predetermined range but does not reach the preset position, said control module controls the ignition unit to ignite the air-fuel mixture in the specific cylinder at a timing after elapse of a preset time period since the full stop of the internal combustion engine as the specified timing.

2. An internal combustion engine system in accordance with claim 1, wherein the specified timing represents a timing of restarting the internal combustion engine after the full stop of the internal combustion engine.

3. An internal combustion engine system in accordance with claim 1, said internal combustion engine system further comprising:

a rotation speed measurement unit that measures a rotation speed of the internal combustion engine, wherein in response to reception of the stop instruction of the internal combustion engine, said control module controls the fuel injection unit to prohibit fuel injection until the measured rotation speed of the internal combustion engine reaches a preset fuel injection-start reference rotation speed, said control module controlling the fuel injection unit to allow fuel injection while the measured rotation speed of the internal combustion engine varies from the preset fuel injection-start reference rotation speed to a preset fuel injection-stop reference rotation speed, and said control module controlling the fuel injection unit to prohibit fuel injection again after the measured rotation speed of the internal combustion engine reaches the preset fuel injection-stop reference rotation speed, said control module thus implementing the fuel injection in the specific cylinder that is expected to stop in the predetermined range.

4. An internal combustion engine system in accordance with claim 1, said internal combustion engine system further comprising:

an engine stop position prediction unit that predicts a stop position of the internal combustion engine, wherein in response to reception of the stop instruction of the internal combustion engine, said control module controls the fuel injection unit to inject the fuel at a fuel injection timing immediately before the full stop of the internal combustion engine into a cylinder that is expected to stop in the predetermined range when the internal combustion engine stops at the stop position predicted by the engine stop position prediction unit.

5. An internal combustion engine control method of controlling an internal combustion engine that has multiple cylinders and is capable of individually injecting a fuel into an intake system in each of the multiple cylinders, when the specific cylinder receiving the fuel injection exceeds a predetermined range that includes part of a compression stroke and reaches a preset position in an expansion stroke, said internal combustion engine control method igniting the air-fuel mixture in the specific cylinder at a timing of reaching the preset position, when the specific cylinder receiving the fuel injection exceeds the predetermined range but does not reach the preset position, said internal combustion engine control method igniting the air-fuel mixture in the specific cylinder at a timing after elapse of a preset time period since a full stop of the internal combustion engine.

6. An internal combustion engine control method in accordance with claim 5, in response to reception of a start instruction of the internal combustion engine, said internal combustion engine control method starting the internal combustion engine with ignition, which is performed at a first ignition timing in a cylinder that is actually at a stop in the predetermined range that includes part of a compression stroke, based on a measured crank angle.

* * * * *